Patented Feb. 16, 1932

1,845,346

UNITED STATES PATENT OFFICE

WINFIELD SCOTT, OF AKRON, OHIO, ASSIGNOR TO THE RUBBER SERVICE LABORATORIES COMPANY, OF AKRON, OHIO, A CORPORATION OF OHIO

MANUFACTURE OF AGE RESISTING VULCANIZED RUBBER

No Drawing.  Application filed October 12, 1927. Serial No. 225,844.

The present invention relates to the manufacture of a vulcanized rubber product possessing good ageing qualities or resistance to deterioration. The main object of the present invention is to improve the anti-oxidant properties of a vulcanized rubber product by means of a novel process of compounding the rubber with certain ingredients adapted to produce the desired result. The invention will be readily understood from the following description and examples wherein the invention is fully set forth and described.

Aldehyde-amine reaction products of various types heretofore have been described as comprising effective rubber vulcanization accelerators. The most active of this type of accelerators, in general, comprise the reaction product of an aliphatic aldehyde with an aromatic primary amine containing a single benzene nucleus. Such accelerators in general impart anti-oxidant characteristics to a vulcanized rubber product to a greater degree than is shown by many of the commonly used vulcanization accelerators.

A recent development in rubber compounding practice has comprised the addition of one of certain so-called anti-oxidants to a rubber mix containing the usual compounding ingredients, including an accelerator. The best known commercial anti-oxidants comprise such materials as the reaction product of an aliphatic aldehyde with the salt of an amine, for example the acetaldehyde reaction product of aniline hydrochloride or the product of an aliphatic aldehyde with an aromatic amine containing more than one benzene nucleus, for example the reaction product of aldol with alpha naphthylamine. Such products possess substantially little accelerating power, but their presence in a rubber mix materially lengthens the serviceable life of a vulcanized rubber product.

It has now been found that the aldehyde-amine reaction product preferably manufactured by the combination of substantially equi-molecular proportions of an aldehyde and an amine and which are for the most part vulcanization accelerators, can be transformed into products that are substantially non-accelerators but which are effective anti-oxidants, by treating said accelerators with approximately an equivalent quantity of a strong acid, then digesting until the accelerator has gone into solution and finally precipitating the anti-oxidant by neutralizing the acid.

Accelerators manufactured by the combination of substantially equi-molecular proportions of an aldehyde and an amine, such as ethylidene-aniline, butylidene-aniline, aldol-aniline, acrolein-aniline, crotonaldehyde-aniline, tiglic aldehyde-aniline and the like have been subjected to the acid treatment hereinbefore mentioned and changed into products that were substantially non-accelerators but which were found to be effective anti-oxidants.

One example of a mode of manufacturing products of the preferred type is as follows: One molecular proportion of aniline (93 parts) was reacted with an equivalent molecular proportion of aldol (88 parts) by adding the aldol slowly to the aniline while maintaining the temperature of the mass preferably at a point below 50° C. After all of the aldol had been added to the aniline, the mixture was maintained at from 35 to 50° C., preferably with stirring, for several hours or for a somewhat longer period at ordinary temperatures in order to insure complete combination of the ingredients. The viscous, syrup-like aldol-aniline product was then treated with approximately one molecular proportion of a dilute acid, for example 18% hydrochloric acid, while maintaining the temperature of the mass below 50° C. The mass was stirred until complete solution of the aldol-aniline product had taken place and the solution was allowed to stand for several hours to complete the transformation of the product by the acid. After the acid treatment had been completed, the solution was diluted with water and then neutralized by means of a suitable alkali, such as caustic soda and the like. The precipitated product was then filtered, washed and dried and was then ready for incorporation into a rubber mix.

By proceeding in a manner similar to that set forth in the example, other aldehyde-amine reaction products and particularly such products of that type as are vulcanization accelerators, are transformed into a substantially non-accelerating anti-oxidant. Although other proportions of aldehyde, of aniline and of acid than those set forth in the example can be employed and are within the scope of the invention, the most active anti-oxidants have been obtained by the treatment of the reaction product of an aromatic primary amine such as aniline, the toluidines, the xylidenes, the naphthylamines, amino cymenes and the like upon substantially equi-molecular proportions of an aliphatic aldehyde, preferably a beta-hydroxy-aldehyde or an alpha-beta unsaturated aliphatic aldehyde with approximately equi-molecular proportions of an acid, which treatment is followed by a neutralization of the acid.

The use of the preferred type of anti-oxidant in the manufacture of a vulcanized rubber product possessing age-resisting characteristics is shown by the following example. A rubber mix was prepared in the well known manner comprising 80 parts of pale crepe rubber,
4 parts of zinc oxide,
1.8 parts of sulphur,
0.8 parts of di-phenyl-guanidine,
2.4 parts of aldol-aniline product dissolved and digested in hydrochloric acid and neutralized in the manner as described. This mix was then cured by heating the stock for forty minutes in a press maintained substantially at the temperature given by forty pounds steam pressure per square inch. Samples of this same stock, vulcanized in the manner described, were also subjected to an artificial ageing test wherein the samples were subjected for eighteen hours to the action of oxygen under a pressure of 500 pounds per square inch and at a temperature of 90° C. The characteristics of the unaged and aged stocks were then determined and the following results were obtained:

| Stock | Cure | Modulus of elasticity in lbs./in.² at elongations of— | | | Tensile at break in lbs./in.² | Ultimate elongation |
| --- | --- | --- | --- | --- | --- | --- |
| | | 300% | 500% | 700% | | |
| Unaged | 40 minutes at 40 lbs. steam pressure. | 223 | 555 | 1828 | 2853 | Per cent 800 |
| Aged | 40 minutes at 40 lbs. steam pressure. | 175 | 465 | 1240 | 1425 | 720 |

The above stock after ageing was found to be in good condition and to have retained the characteristic appearance of a vulcanized rubber compound. Although the aged sample possessed a tensile strength at break that was approximately one-half that of the unaged stock, the stock retained its essential characteristics in a most remarkable manner when the severity of the ageing test to which the stock was subjected is considered. A rubber stock cured in the presence of di-phenyl-guanidine as an accelerator is well known in the art as a compound that ages badly. As a matter of fact, a control stock prepared in the manner set forth in the example but without the incorporation therein of any of the anti-oxidant, and vulcanized, was found to disintegrate into a shapeless, porous, sticky mass that possessed none of the attributes of vulcanized rubber.

Further examples of the use of the preferred type of anti-oxidants in a rubber mix are set forth in the manufacture of the rubber compound comprising 80 parts of pale crepe rubber,
4 parts of zinc oxide,
1.8 parts of sulphur,
0.8 parts of di-phenyl-guanidine,
4.0 parts of age resisting compound.

As age resisting compounds there were employed the reaction products of aldol-aniline, acrolein-aniline, and tiglic aldehyde-aniline, all acid-treated, digested and neutralized in the manner hereinbefore set forth.

In order to impose particularly drastic conditions in the tests, rubber compounds prepared in accordance with the above formula were cured for forty minutes and also for one hour at the temperature given by forty pounds steam pressure per square inch. It is well known that rubber manufactured by employing di-phenyl-guanidine as an accelerator deteriorates rapidly when overcured. The rubber samples described in the example as vulcanized for an hour at forty pounds steam pressure (287° F.) were purposely somewhat overcured in order to illustrate the anti-oxidant characteristics of rubber stocks containing the preferred type of age resisting compounds.

The ageing tests to which the vulcanized rubber samples were subjected comprised subjecting the samples to a pressure of 500 pounds of oxygen per square inch at a temperature of 90° C. for 18 hours. Rubber samples manufactured in accordance with the formula set forth in the example but not including any anti-oxidant, when vulcanized for forty minutes or for one hour under the conditions hereinbefore described and subjected to the oxygen bomb test were found to have disintegrated to a swollen, porous mass possessing no elasticity and incapable of being subjected to ordinary tests. The aged samples of those stocks containing the anti-oxidants set forth, still retained the appearance of vulcanized rubber and although the ageing test was particularly rigorous, the samples of rubber containing the anti-oxidant could still be tested by employing the usual tests to which vulcanized rubber is subjected.

The results of the tests discussed above are as follows:

| Anti-oxidant | Time of cure | Hours aged | Modulus of elasticity in lbs./in.² at elongations of— | | | Tensile at break in lbs./in.² | Ultimate elongation |
| --- | --- | --- | --- | --- | --- | --- | --- |
| | | | 300% | 500% | 700% | | |
| | | | | | | | Per cent |
| Aldol-aniline. | 40 minutes at 40 lbs. steam. | 0 | 236 | 721 | 2440 | 3173 | 785 |
| Aldol-aniline. | 1 hour | 0 | 307 | 848 | 2730 | 3398 | 810 |
| Aldol-aniline. | 40 minutes | 18 | 270 | 788 | 2310 | 2358 | 715 |
| Aldol-aniline. | 1 hour | 18 | 311 | 890 | | 2353 | 675 |
| Acrolein aniline. | 40 minutes at 40 lbs. steam. | 0 | 248 | 709 | 2380 | 3218 | 800 |
| Acrolein aniline. | 1 hour | 0 | 265 | 784 | 2535 | 3175 | 760 |
| Acrolein aniline. | 40 minutes | 18 | 197 | 543 | 1470 | 1510 | 715 |
| Acrolein aniline. | 1 hour | 18 | 240 | 625 | | 1063 | 605 |
| Tiglic aldehyde aniline. | 40 minutes at 40 lbs. steam. | 0 | 334 | 1018 | 3520 | 3520 | 700 |
| Tiglic aldehyde aniline. | 40 minutes | 18 | 250 | 691 | | 1210 | 615 |

It is to be understood that the anti-oxidants set forth in the above table are compounds manufactured by the process described herein and according to which an aldehyde-amine reaction product is treated with an acid, dissolved and digested therein and neutralized. The above tests were all carried out by imposing unusually severe experimental conditions. Even under such conditions, a rubber stock which aged very badly was transformed into a stock that possessed exceptionally good ageing properties by the incorporation into that stock of from 3 to approximately 5% on the weight of the rubber employed of one of the new type of anti-oxidants.

Other examples of the use of the new class of anti-oxidant materials are apparent to those skilled in the art of rubber compounding. Other compounding ingredients, accelerators and different proportions of ingredients than those set forth in the examples given can be employed in the manufacture of rubber products intended for different purposes. The invention is to be considered as limited solely by the following claims attached hereto as a part of this specification wherein I intend to claim all novelty inherent in my invention as is permissible in view of the prior art.

What I claim is:

1. The process of manufacturing an age resisting vulcanized rubber product which comprises curing a rubber composition of vulcanization characteristics in the presence of an anti-oxidant comprising the product obtained by neutralizing the solution obtained by digesting at temperatures substantially between 35 to 50° C. the reaction product of substantially equi-molecular proportions of an hydroxy aliphatic aldehyde and a primary aromatic amine with substantially an equivalent proportion of a strong mineral acid.

2. The process of manufacturing an age resisting vulcanized rubber product which comprises curing a rubber composition of vulcanization characteristics in the presence of an anti-oxidant comprising the product obtained by neutralizing the solution obtained by digesting at temperatures substantially between 35 to 50° C. the reaction product of substantially equi-molecular proportions of a beta substituted aliphatic aldehyde and a primary aromatic amine with substantially an equivalent proportion of a strong acid.

3. The process of manufacturing an age resisting vulcanized rubber product which comprises curing a rubber composition of vulcanization characteristics in the presence of an anti-oxidant comprising the product obtained by neutralizing the solution obtained by digesting at temperatures substantially between 35 to 50° C. the reaction product of substantially equi-molecular proportions of a beta substituted aliphatic hydroxy aldehyde and a primary aromatic amine with substantially an equivalent proportion of a strong acid.

4. The process of manufacturing an age resisting vulcanized rubber product which comprises curing a rubber composition of vulcanization characteristics in the presence of an anti-oxidant comprising the product obtained by neutralizing the solution obtained by digesting at temperatures substantially between 35 to 50° C. the reaction product of substantially equi-molecular proportions of an aldol and a primary aromatic amine with substantially an equivalent proportion of hydrochloric acid.

5. The process of manufacturing an age resisting vulcanized rubber product which comprises curing a rubber composition of vulcanization characteristics in the presence of an anti-oxidant comprising the product obtained by neutralizing the solution obtained by digesting at temperatures substantially between 35 to 50° C. the reaction product of substantially equi-molecular proportions of acetaldol and aniline with substantially an equivalent proportion of hydrochloric acid.

6. The process of manufacturing an age resisting vulcanized rubber product which comprises curing a rubber composition of vulcanization characteristics in the presence of an anti-oxidant comprising the product obtained by neutralizing the solution obtained by digesting at temperatures substantially between 35 to 50° C. the reaction product of substantially equi-molecular proportions of acetaldol and aniline with substantially an equivalent proportion of hydrochloric acid.

7. The process of manufacturing an age resisting vulcanized rubber product which comprises curing a rubber composition of vulcanization characteristics in the presence of an anti-oxidant comprising the product obtained by neutralizing by means of caustic soda the solution obtained by digesting at temperatures substantially between 35 to 50° C. the reaction product of substantially equi-molecular proportions of acetaldol and aniline with substantially an equivalent proportion of 18% hydrochloric acid.

8. An age resisting rubber composition comprising the vulcanization product of a rubber composition of vulcanization characteristics, said composition containing an anti-oxidant comprising the product obtained by neutralizing the solution obtained by digesting at temperatures substantially between 35 to 50° C. the reaction product of substantially equi-molecular proportions of an hydroxy aliphatic aldehyde and a primary aromatic amine with substantially an equivalent proportion of a strong mineral acid.

9. An age resisting rubber composition comprising the vulcanization product of a rubber composition of vulcanization characteristics, said composition containing an anti-oxidant comprising the product obtained by neutralizing the solution obtained by digesting at temperatures substantially between 35 to 50° C. the reaction product of substantially equi-molecular proportions of a beta substituted aliphatic aldehyde and a primary aromatic amine with substantially an equivalent proportion of a strong acid.

10. An age resisting rubber composition comprising the vulcanization product of a rubber composition of vulcanization characteristics, said composition containing an anti-oxidant comprising the product obtained by neutralizing the solution obtained by digesting at temperatures substantially between 35 to 50° C. the reaction product of substantially equi-molecular proportions of a beta substituted aliphatic hydroxy aldehyde and a primary aromatic amine with substantially an equivalent proportion of a strong acid.

11. An age resisting rubber composition comprising the vulcanization product of a rubber composition of vulcanization characteristics, said composition containing an anti-oxidant comprising the product obtained by neutralizing the solution obtained by digesting at temperatures substantially between 35 to 50° C. the reaction product of substantially equi-molecular proportions of an aldol and a primary aromatic amine with substantially an equivalent proportion of hydrochloric acid.

12. An age resisting rubber composition comprising the vulcanization product of a rubber composition of vulcanization characteristics, said composition containing an anti-oxidant comprising the product obtained by neutralizing the solution obtained by digesting at temperatures substantially between 35 to 50° C. the reaction product of substantially equi-molecular proportions of acetaldol and aniline with substantially an equivalent proportion of hydrochloric acid.

13. An age resisting rubber composition comprising the vulcanization product of a rubber composition of vulcanization characteristics, said composition containing an anti-oxidant comprising the product obtained by neutralizing the solution obtained by digesting at temperatures substantially between 35 and 50° C. the reaction product of substantially equi-molecular proportions of acetaldol and aniline with substantially an equivalent proportion of hydrochloric acid.

14. An age resisting rubber composition comprising the vulcanization product of a rubber composition of vulcanization characteristics, said composition containing an anti-oxidant comprising the product obtained by neutralizing by means of caustic soda the solution obtained by digesting at temperatures substantially between 35 to 50° C. the reaction product of substantially equi-molecular proportions of acetaldol and aniline with substantially an equivalent proportion of 18% hydrochloric acid.

In testimony whereof I hereunto affix my signature.

WINFIELD SCOTT.